Figure 1:
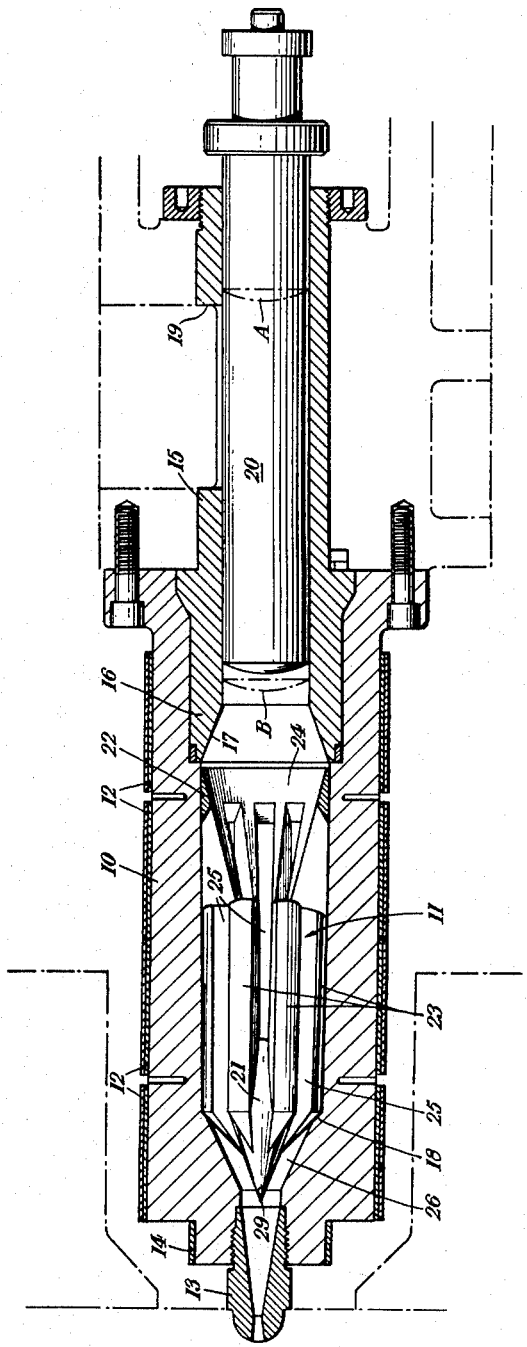

Nov. 22, 1955 S. C. H. SMITH 2,724,146
INJECTION MOULDING MACHINES
Filed Nov. 8, 1951 2 Sheets-Sheet 1

Inventor
Samuel Charles Henry Smith
By Moses, Nolte, Crews & Berry
Attorneys

Nov. 22, 1955  S. C. H. SMITH  2,724,146
INJECTION MOULDING MACHINES
Filed Nov. 8, 1951  2 Sheets-Sheet 2

Inventor
Samuel Charles Henry Smith
By Moses, Nolte, Crews & Berry
Attorneys ved uniformly throughout its length, but it is preferred to employ outwardly divergent slots, i. e. slots which increase in cross section in an outward direction, in order to obtain a maximum surface area of material in immediate proximity to the heater.

United States Patent Office 2,724,146
Patented Nov. 22, 1955

2,724,146

INJECTION MOULDING MACHINES

Samuel Charles Henry Smith, West Ewell, England, assignor to R. H. Windsor Limited, London, England Application November 8, 1951, Serial No. 255,354

Claims priority, application Great Britain November 20, 1950

5 Claims. (Cl. 18—30)

As is well known, injection moulding machines have a cylinder which is periodically supplied with a charge of moulding powder, and which contains an injection plunger which, on its injection stroke, forces the moulding powder into a plasticizing chamber. The plasticizing chamber leads to the injection nozzle, through which the plasticized moulding powder is forced into the dies.

It is necessary to ensure that the whole of the material in the plasticizing chamber will be effectively plasticized before it reaches the nozzle and the normal practice is to provide in the plasticizing chamber a torpedo shaped spreader which extends for substantially the whole length of the chamber and is supported at both ends. This procedure has several disadvantages. Firstly, the suspension for the spreader at its forward end has to be bored to provide for passage of the material to the nozzle orifice, and this introduces a restriction to flow which renders the effective pressure on the material in the nozzle considerably less than the pressure exerted by the plunger. Secondly, it is necessary to provide an internal heater for the large spreader and electric leads for the heater accordingly have to pass through the wall of the plasticizing chamber. This involves great difficulties, since pressures of the order of 20,000 lbs./sq. in. are exerted by the plunger.

The object of the invention is to provide, in an injection moulding machine, a plasticizing chamber which ensures effective and uniform plasticization of the material, provides a free exit of the material to the nozzle imposing the minimum restriction to flow, and requires no internal heater.

The invention accordingly provides an injection moulding machine in which the plasticizing chamber has a forwardly tapering central conical cavity, communicating at its rear end with the cylinder and communicating throughout substantially the whole of its length with a plurality of radial slots through which plasticized material may flow outwardly from the cavity to the wall of the chamber, the slots communicating at their forward ends with a bore affording free flow for the plasticized material into the nozzle, and in which external heating only is provided along substantially the whole length of the chamber.

In operation, the conical cavity is always filled with relatively cold material while the slots are filled with plasticized material. At each stroke of the plunger, a plug of compacted granular moulding powder is forced into the rear end of the plasticizing chamber. Preferably the external heater extends rearwardly from the plasticizing chamber and surrounds the forward end of the cylinder so that this plug of material is partially plasticized in its outer layers.

In the rear end of the conical cavity is the plug of material forced forwards during the last preceding injection stroke. Part of this material has been forced outwardly into the slots and has become plasticized due to its close proximity to the heater, but its central portion is unplasticized. Immediately ahead of this, is another plug of material, delivered by the plunger on a still earlier stroke. More of this plug has flowed out into the slots and has become plasticized and its central unplasticized core is accordingly smaller.

Each plug of material therefore, as it is forced stepwise forward into the conical cavity at successive injection strokes of the plunger experiences gradual plasticization. The central unplasticized portion becomes smaller and smaller until finally, when the material has reached the narrow forward end of the cavity, it is plasticized throughout.

It will be understood that the length and amount of taper of the cavity, and the number of slots, will be calculated for each machine, according to the charge delivered at full effective stroke of the plunger, the thickness of the wall of the plasticizing chamber, and the amount of heat available from the heater. It is preferred to employ outwardly divergent slots, i. e. slots which increase in cross section in an outward direction, in order to obtain a maximum surface area of material in immediate proximity to the heater.

One specific embodiment of injection moulding machine having a plasticizing chamber according to the invention will now be described in detail, by way of example, with reference to the accompanying drawings. It is intended for use with cellulose acetate moulding powder and in a machine which delivers a 20 oz. charge at full stroke.

Figure 2:
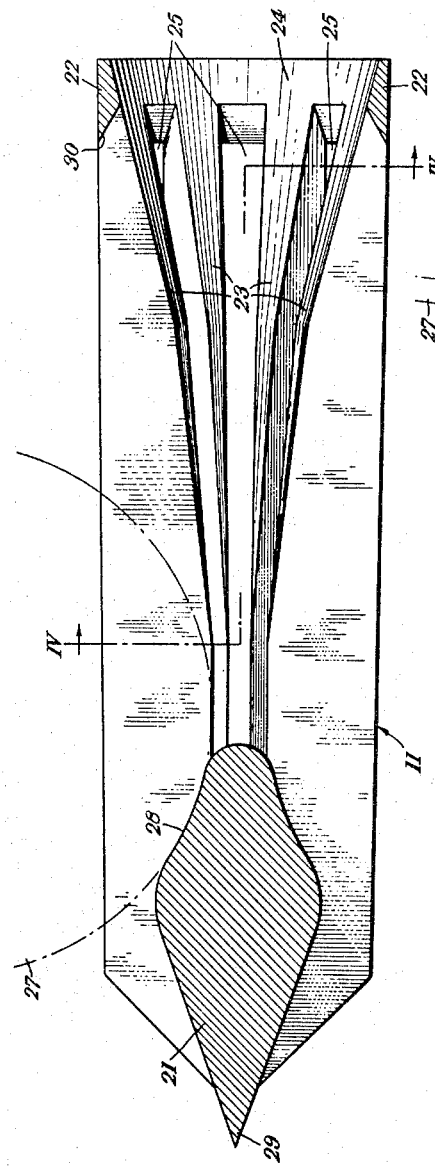
Figure 4:
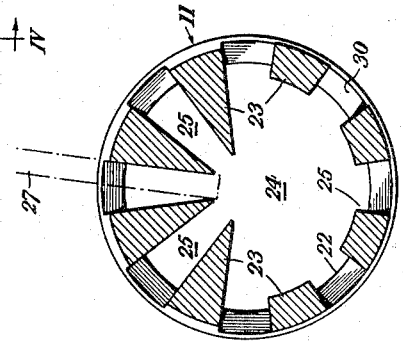
Figure 3:
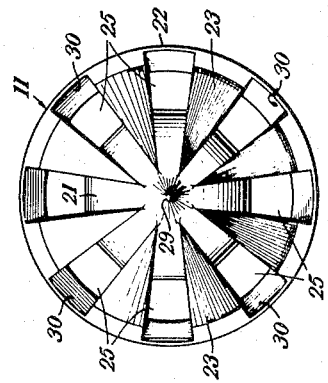

In the drawings:

Fig. 1 is a longitudinal section through the cylinder, plasticizing chamber and injection nozzle, the spreader in the plasticizing chamber being shown partly in elevation, Fig. 2 is a longitudinal section, on a larger scale, through the spreader, Fig. 3 is an end elevation, looking from the left hand side of Fig. 2, and Fig. 4 is a section on the line IV—IV in Fig. 2.

The plasticizing chamber comprises an outer barrel 10 and an inner spreader 11. The spreader 11 has a slight forward taper, of about 2°, and is pushed from the rear into the barrel 10 which has a corresponding taper. Alternatively the spreader and barrel may have parallel walls, the spreader being shrunk into the barrel. This provides a very close fit between the two parts such as will afford maximum conduction of heat from the external heaters 12 to the material in the chamber. Owing to the close fit, there is no danger of material flowing between the two parts and there becoming decomposed and producing black streaks in the moulded articles. The barrel 10 and spreader 11 are made of steel, and the barrel 10 has, near its forward end, a 45° conical seating 18 which coacts with a corresponding conical formation at the forward end of the spreader 11. There are four external electric heaters 12, disposed as shown in Fig. 1. The injection nozzle 13 is screwed into the forward end of the barrel 10 and an additional electric heater 14 surrounds the rear end of the nozzle.

The cylinder liner 15 has a spigot 16 at its forward end which fits into the rear end of the barrel 10 and is surrounded by the rear heater 12. The spigot 16 is flared, at 17, so that its diameter increases gradually to that of the portion of the bore of the barrel 10 containing the spreader 11. The cylinder liner 15 has an inlet 19 through which moulding powder may flow from a hopper, not shown, into the cylinder liner when the injection plunger 20 moves to its rear position A. The plunger 20 is then moved hydraulically forwards to compress the powder and force it forward into the plasticizing chamber. The limiting forward position of the plunger is shown at B.

The spreader 11 consists of a bulbous nose 21, a rear annulus 22 and a series of radial fins 23 extending between the nose 21 and the annulus 22 and defining a central forwardly tapering conical cavity 24 and a series of radial outwardly diverging slots 25. The nose 21 of the spreader projects forwardly, beyond the conical seating 18 at the forward end of the barrel, into a forwardly converging extension 26 of the bore of the barrel which leads to the injection nozzle 13. The extension 26 defines, with the nose 21, an annular chamber of progressively diminishing cross section in which the individual streams of plasticised material issuing from the slots 25 are welded together on their passage to the nozzle 13.

The spreader is made as follows. A cylindrical billet is first turned to provide the above-described external taper. The forward end of the billet is then machined to provide the above-described 45° half apex angle conical formation which coacts with the seating 18 on the barrel, leaving a cylindrical central pip on this conical surface. A central longitudinal hole is then drilled into the rear end of the billet. The hole is then bored so as to open it to form the forwardly tapering conical cavity 24.

Eight equally spaced radial throughgoing slots 25 are then milled in succession in the billet. Two cuts are made to form each slot, the centre line of the cutter 27 being inclined, in each case, at 7½° to the radius of the workpiece and on opposite sides thereof.

The formation of the slots leaves the bulbous nose portion 21 at the forward end of the spreader, from which project the radial fins 23 constituting the partitions between the slots 25 and united by the annulus 22. The portions 28 of the nose at the bottom of the slots are filed to give them a smooth rounded contour, and the pip at the forward end of the nose is turned to form a conical projection 29. The ends of the slots are finally cut back at 30, by cuts extending inwardly and rearwardly from the ends, to facilitate entry of material into the slots from the conical cavity.

When the spreader is introduced into the barrel, the conical projection 29 projects into the forwardly converging extension 26 of the bore of the barrel. Free passage is left for material to pass from the slots 25 into the nozzle 13 without substantial restriction to flow.

I find that, by the use of such a spreader, it is possible to mould effectively plastic materials, which are liable to give trouble in a conventional plasticizing chamber due to turbulence occurring in the chamber and causing air bubbles to form in the finished moulding.

Where the moulding pressures used are not too high, the spreader may be made of a beryllium-copper alloy, instead of from steel, so as to obtain better thermal conductivity.

In place of making the plasticizing chamber of two parts, separately formed and fitted together, it is possible to make the barrel and spreader as a single unit by casting, using the lost wax or an equivalent method. In this case the nose portion may be made considerably smaller, as it no longer serves the function of supporting the fins of the spreader.

What I claim as my invention and desire to secure by Letters Patent is:

1. In an injection moulding machine the combination with an injection cylinder, a reciprocating injection plunger in said cylinder, and an injection nozzle, of a plasticising chamber disposed between said cylinder and said nozzle and serving to convey material forwardly from the cylinder to the nozzle, said plasticising chamber comprising a cylindrical barrel disposed coaxially with said injection cylinder, the bore of said barrel being substantially cylindrical for the major portion of its length and tapering forwardly at the end adjoining said nozzle, a spreader disposed within said barrel and fitted closely therein, said spreader comprising a bulbous nose at its forward end and a plurality of radially extending ribs integral with and projecting rearwardly from said nose, said ribs abutting closely at their outer ends against the inner wall of said barrel and defining by their inner ends a forwardly tapering conical cavity, located centrally of said spreader, open at its rear end to said cylinder and serving to receive unplasticised material therefrom, said ribs defining between them radial slots communicating with said cavity throughout substantially the whole of its length and said slots permitting of outward flow of plasticised material from said cavity between said ribs to the inner wall of the barrel, said bulbous nose being disposed within the tapering portion of the bore of the barrel and defining therewith an annular chamber of progressively diminishing cross section affording unobstructed passage for plasticised material from all of said slots to said nozzle, and heating means external to the spreader and extending for substantially the whole length of said chamber.

2. In an injection moulding machine the combination, with an injection cylinder, a reciprocating injection plunger in said cylinder, and an injection nozzle, of a plasticising chamber disposed between said cylinder and said nozzle and serving to convey material forwardly from the cylinder to the nozzle, said plasticising chamber comprising a cylindrical barrel disposed coaxially with said injection cylinder, the bore of said barrel being substantially cylindrical for the major portion of its length and tapering forwardly at the end adjoining said nozzle, a spreader disposed within said barrel and fitted closely therein, said spreader comprising a bulbous nose at its forward end and a plurality of radially extending ribs integral with and projecting rearwardly from said nose, said ribs abutting closely at their outer ends against the inner wall of said barrel and defining by their inner ends a forwardly tapering conical cavity, located centrally of said spreader, open at its rear end to said cylinder and serving to receive unplasticised material therefrom, said ribs defining between them outwardly diverging radial slots communicating with said cavity throughout substantially the whole of its length and said slots permitting of outward flow of plasticised material from said cavity between said ribs to the inner wall of the barrel, said bulbous nose being disposed within the tapering portion of the bore of the barrel and defining therewith an annular chamber of progressively diminishing cross section affording unobstructed passage for plasticised material from all of said slots to said nozzle, and heating means external to the spreader and extending for substantially the whole length of said chamber.

3. In an injection moulding machine the combination, with an injection cylinder, a reciprocating injection plunger in said cylinder, and an injection nozzle, of a plasticising chamber disposed between said cylinder and said nozzle and serving to convey material forwardly from the cylinder to the nozzle, said plasticising chamber comprising a cylindrical barrel disposed coaxially with said injection cylinder, the bore of said barrel being substantially cylindrical for the major portion of its length and tapering forwardly at the end adjoining said nozzle, a spreader disposed within said barrel and fitted closely therein, said spreader comprising a bulbous nose at its forward end and a plurality of radially extending ribs integral with and projecting rearwardly from said nose, said ribs abutting closely at their outer ends against the inner wall of said barrel and defining by their inner ends a forwardly tapering conical cavity, located centrally of said spreader, open at its rear end to said cylinder and serving to receive unplasticised material therefrom, said ribs defining between them radial slots communicating with said cavity throughout substantially the whole of its length and said slots permitting of outward flow of plasticised material from said cavity between said ribs to the inner wall of the barrel, said bulbous nose being disposed within the tapering portion of the bore of the barrel and defining therewith an annular chamber of progressively diminishing cross section affording unobstructed passage for plasticised material from all of said slots to said nozzle, and external heating means surrounding substantially the whole length of said barrel and also the forward end of said cylinder.

4. In an injection moulding machine the combination, with an injection cylinder, a reciprocating injection plunger in said cylinder, and an injection nozzle, of a plasticising chamber disposed between said cylinder and said nozzle and serving to convey material forwardly from the cylinder to the nozzle, said plasticising chamber comprising a cylindrical barrel disposed coaxially with said injection cylinder, the bore of said barrel being substantially cylindrical for the major portion of its length and tapering forwardly at the end adjoining said nozzle, a spreader disposed within said barrel and fitted closely therein, said spreader comprising at its forward end a bulbous nose having a conical forwardly tapering point, and a plurality of radially extending ribs integral with and projecting rearwardly from said nose, said ribs abutting closely at their outer ends against the inner wall of said barrel and defining by their inner ends a forwardly tapering conical cavity, located centrally of said spreader, open at its rear end to said cylinder and serving to receive unplasticised material therefrom, said ribs defining between them radial slots communicating with said cavity throughout substantially the whole of its length and said slots permitting of outward flow of plasticised material from said cavity between said ribs to the inner wall of the barrel, the conical point of said bulbous nose being disposed within the tapering portion of the bore of the barrel and defining therewith an annular chamber of progressively diminishing cross section affording unobstructed passage for plasticised material from all of said slots to said nozzle, and heating means external to the spreader and extending for substantially the whole length of said chamber.

5. In an injection moulding machine the combination with an injection cylinder, a reciprocating injection plunger in said cylinder, and an injection nozzle, of a plasticising chamber disposed between said cylinder and said nozzle and serving to convey material forwardly from the cylinder to the nozzle, said plasticising chamber comprising a cylindrical barrel disposed coaxially with said injection cylinder, the bore of said barrel tapering forwardly at the end adjoining said nozzle, a spreader disposed within said barrel and fitted closely therein, said spreader comprising a bulbous nose at its forward end and a plurality of radially extending ribs integral with and projecting rearwardly from said nose, said ribs abutting closely at their outer ends against the inner wall of said barrel and defining by their inner ends a forwardly tapering conical cavity, located centrally of said spreader, open at its rear end to said cylinder and serving to receive unplasticised material therefrom, said ribs defining between them radial slots communicating with said cavity throughout substantially the whole of its length and said slots permitting of outward flow of plasticised material from said cavity between said ribs to the inner wall of the barrel, said bulbous nose being disposed within the tapering portion of the bore of the barrel and defining therewith an annular chamber of progressively diminishing cross section affording unobstructed passage for plasticised material from all of said slots to said nozzle and said spreader comprising a rear annular portion integral with said ribs, the forward end of said annular portion being cut back to facilitate passage of material from said cavity to said slots, and heating means external to the spreader and extending for substantially the whole length of said chamber.

References Cited in the file of this patent

UNITED STATES PATENTS

| | | |
|---|---|---|
| 2,057,945 | Gastrow | Oct. 20, 1936 |
| 2,308,867 | Dinzl | Jan. 19, 1943 |
| 2,480,838 | Caron | Sept. 6, 1949 |
| 2,482,243 | Burnham | Sept. 20, 1949 |

FOREIGN PATENTS

| | | |
|---|---|---|
| 622,258 | Great Britain | Apr. 28, 1949 |